FIELD EFFECT TRANSISTOR MEMORY CELL
Filed Oct. 19, 1967
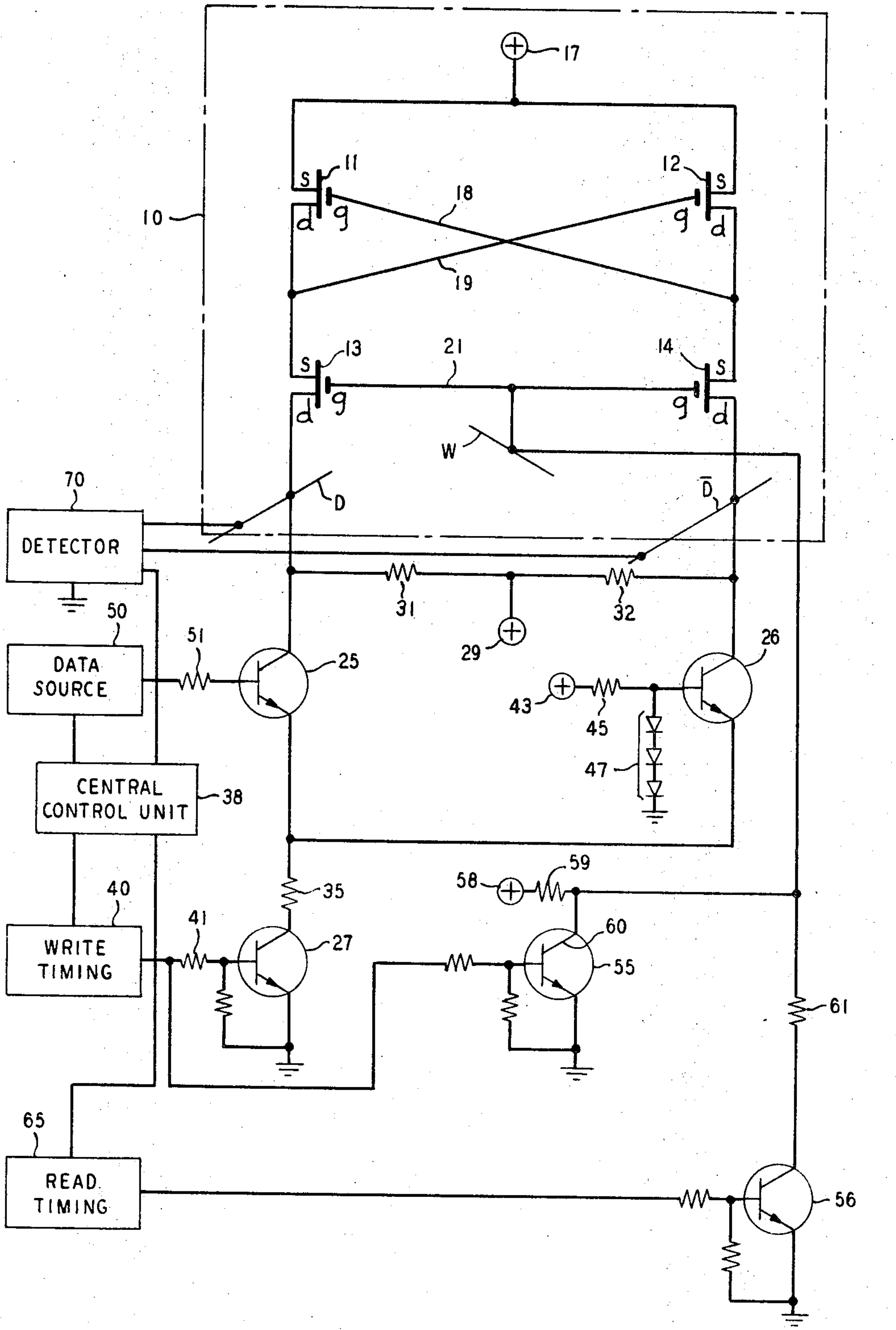
INVENTOR
D. A. HODGES
BY
Charles Scott Phelan
ATTORNEY United States Patent Office 3,540,007

Patented Nov. 10, 1970

3,540,007

FIELD EFFECT TRANSISTOR MEMORY CELL

David A. Hodges, Mountainside, N.J., assignor to Bell Telephone Laboratories, Incorporated, Murray Hill and Berkeley Heights, N.J., a corporation of New York Filed Oct. 19, 1967, Ser. No. 676,491
Int. Cl. G11c *7/00, 11/40;* H03k *3/286*
U.S. Cl. 340—173 6 Claims

ABSTRACT OF THE DISCLOSURE

A cross-coupled flip-flop stage, or memory cell, for a word oriented array of memory cells is developed from four insulated-gate field-effect transistors which perform storage, loading, and gating functions of the cell. The functions of the cell are controlled by three different voltage levels coupled by a word line to all cells of a memory word.

Associated with the array are bipolar transistor word-line-select and digit-write circuits used for achieving a low select-read-write cycle time for the memory cells.

BACKGROUND OF THE INVENTION

Field of the invention

The invention is a memory cell that is more particularly described as an insulated-gate field-effect transistor (IGFET) flip-flop circuit.

Description of the prior art

In the prior art, the insulated-gate field-effect transistor has been arranged in various configurations of bistable stages, or cells, resembling bipolar transistor flip-flops. "Bipolar transistor" denotes a transistor, such as a conventional junction transistor, in which both majority and minority carriers are required for operation, whereas an IGFET is considered to be a unipolar transistor in which only majority carriers are required for operation. Conduction in an IGFET device is controlled by signals applied to a control electrode without current between that electrode and controlled electrodes because the control electrode is insulated from the controlled electrodes. In bipolar transistors, there are current paths connecting the control electrode to the controlled electrodes. IGFET memory cells are also known to consume significantly less power than bipolar transistor cells.

In the prior art, each IGFET memory cell generally requires at least four leads to the cell, a pair of cross-coupled IGFET devices, a pair of load devices, and two additional IGFET devices for gating information into and out of the cell.

The cost of an IGFET memory system includes the sum of the cost of peripheral circuits plus the product of the number of cells times the cost per cell. The number of cells per system usually is controlled by the job to be performed by the system and is therefore a constant. System cost can be reduced by utilizing inexpensive cells. To achieve a reduction of system cost, the overall decrease of cost in providing all of the cells must be greater than any resulting increase in the cost of peripheral equipment.

An IGFET memory cell can be constructed as an integrated-circuit which is built in a semiconductor substrate. The cost of each IGFET memory cell is largely dependent upon the amount of semiconductor substrate area required for the cell and therefore it roughly proportional to the number of devices within the cell and the number of leads to the cell. A reduction of the number of devices in each cell or a reduction of the number of leads to each cell reduces the required substrate area and the cost of the cell. A substantial reduction of the number of devices or leads per cell, therefore, can contribute significantly towards decreasing the overall cost of the system.

SUMMARY OF THE INVENTION

It is an object of the invention to reduce the cost of an IGFET memory cell, or stage.

Another object is to reduce the number of devices required in an IGFET memory cell.

A further object is to reduce the number of leads to an IGFET memory cell.

These and other objects of the invention are realized in an illustrative embodiment of an insulated-gate field-effect transistor (IGFET) memory cell which includes a pair of cross-coupled IGFET inverter amplifiers and a second pair of IGFET devices arranged to function both as load devices and as gates for the cell. Complementary digit lines are connected to drain electrodes of the second pair of IGFET devices. Gate electrodes of the second pair of IGFETS are connected to a word line control source which produces three potential levels for controlling read, write and standby operations of the cell. Load and gating functions of the second pair of IGFET devices are possible because the three different potential levels are used for controlling the read, write, and standby operations of the cell.

A feature of the invention is a pair of IGFET devices arranged in a memory cell so that those devices perform both as loads and as gating devices.

Another feature is a means controlling the read, write, and standby operations of the memory cell in response to three different voltage levels.

A further feature is a word line coupling three different voltage levels from a control source to the devices which perfom the combined functions of loading a pair of cross-coupled inverter amplifiers in the cell and gating signals into and out from the cell.

A still further feature is connecting the memory cell to essential peripheral circuits through three leads.

BRIEF DESCRIPTION OF THE DRAWING

A better understanding of the invention may be derived from the detailed description following if that description is considered with respect to the attached drawing which is a schematic diagram of an IGFET memory cell arranged in accordance with the invention.

DETAILED DESCRIPTION

In the diagram there is shown a memory cell 10 which includes four P-channel enhancement-mode IGFET devices 11, 12, 13, and 14 arranged as a flip-flop. The cell 10 is shown illustratively as one cell of a word oriented array of similar cells, the other cells of which are not included in the drawing. Cell 10 operates in response to signals from bipolar transistor word-line-select and digit-write circuits also included in the diagram.

As described by Robert A. Crawford in "MOSFET in Circuit Design," McGraw-Hill (1967), Chapters 1 and 5, the design and the operation of insulated-gate field-effect transistors both as discrete devices and as integrated circuits are well known. An insulated-gate field-effect transistor (IGFET) often is constructed on a semiconductor substrate. Source and drain electrodes are diffused into the substrate at opposite ends of a region through which majority carriers flow in the substrate. This region of the substrate is known in the prior art as the channel of an IGFET. An insulator is placed on the surface of the semi-conductor along the axis of conduction through the semi-conductor channel. A gate electrode is placed on top of the insulator so that the gate electrode is insulated from the channel in the substrate and from the source and drain electrodes. The source electrode is a reference terminal, the gate electrode is a control electrode, and the drain electrode is an output electrode for the device. A metal-oxide-semiconductor field-effect transistor (MOSFET) is one type of IGFET that uses an oxide for the insulator between the gate electrode and the channel in the semiconductor substrate.

The channel is designated P-type because holes are used as majority carriers in the channel. When the source and drain electrodes are both grounded, the potential on the gate controls charge in the channel, that is, a negative bias applied to the gate electrode causes positive charges, or holes, to accumulate in the channel. In operation, the positive charges, or majority carriers, flow from the source to the drain only when the potential of the drain electrode is negative with respect to the potential of the source electrode. The source electrode is coupled to the drain electrode by this flow of positive charge in the channel thereby giving rise to the nomenclature "P-channel device."

The terminology "enhancement-mode" arises in reference to devices used in the illustrative embodiment because a negative polarity voltage difference must be applied between one of the controlled electrodes and the gate electrode to obtain the possibility of conduction in the channel. The voltage required to obtain the possibility of conduction in the channel is called a pinchoff, or threshold, voltage. When the threshold voltage is applied to the gate electrode, the source and drain electrodes and the channel all contain P-type carriers so that no junctions exist between the source and drain electrodes. The potential of the controlled electrode having a fixed potential at such a time is coupled through the channel to the other controlled electrode if the latter electrode is floating. When the voltage applied to the gate electrode is less than the threshold voltage, there are two PN junctions between the source and drain electrodes, one formed between each of those electrodes and the substrate. These two junctions create an effective open circuit between the source and drain electrodes.

A depletion-mode device, on the other hand, can conduct when the gate and source electrodes are at the same potential.

In accordance with well-known theory, potential applied to the gate electrode of an IGFET device controls conduction through the semiconductor channel between the source and drain electrodes of the device. Therefore the gate electrode is considered to be a control electrode, and the source and drain electrodes are considered to be controlled electrodes. For a P-channel enhancement-mode IGFET, the number of majority carriers in the channel and therefore the conductivity of the channel increase as potential on the gate electrode becomes more negative than the threshold voltage, both taken with respect to the potential of the source electrode. There is, however, no current between the channel and the gate electrode or between the source or drain electrode and the gate electrode because the gate electrode is insulated from all of them.

The IGFET devices 11 and 12 are active inverter amplifiers which are interconnected so that they conduct alternatively and thereby determine the state of the cell. The gate electrode of the device 11 is cross-connected by way of a lead 18 to the drain electrode of the device 12, and the gate electrode of the device 12 is cross-connected by way of a lead 19 to the drain electrode of the device 11. A positive-potential source 17 which has the highest positive potential in the circuit is coupled by way of substrate material and spot connections to the source electrode of the device 11 and to the source electrode of the device 12 as a reference voltage. A spot connection is a metallic connection across the junction between a diffused electrode and the substrate. Coupling the reference potential through the substrate eliminates one lead otherwise required for operation of the cell. When the device 11 is cut off during standby operation, its drain electrode is held at a potential that is negative with respect to the reference potential of the source 17 as described hereinafter. The difference in potential between the drain electrode of device 11 and the reference voltage exceeds the threshold voltage of the device 12 so that the device 12 conducts. While the device 12 so conducts, its drain electrode is held at a potential less than the threshold voltage of device 11 from the reference potential to insure that device 11 is cut off. When the device 11 is thus cut off during standby operation, the cell 10 is considered to be storing a binary "1." Conversely, when the device 12 is cut off and the device 11 conducts during standby operation, the cell 10 is considered to be storing a binary "0."

In the diagram each potential source is shown as a circular symbol enclosing a positive polarity designation. The positive designation indicates that the source terminal having positive polarity is connected where shown in the diagram and that the source terminal of negative polarity is connected to ground.

The IGFET devices 13 and 14 are arranged to function as loads for the IGFET devices 11 and 12 and as gates for gating information signals into and out of the cell 10 by way of a pair of complementary digit lines D and $\overline{D}$. Source electrodes of the devices 13 and 14 are connected respectively to the drain electrodes of the devices 11 and 12. A lead 21 interconnects the gate electrode of the device 13 with the gate electrode of the device 14. The lead 21 is additionally connected to a word line W which couples word select signals of three different voltage levels to the lead 21 and therethrough to the gate electrodes of the devices 13 and 14 for controlling the operation of the cell 10. It is noted incidentally that the word line W and the digit lines D and $\overline{D}$ are the only leads required to provide external circuits with access to the cell 10. The cell 10 is held in its standby condition by a high level potential on the word line W so that the devices 13 and 14 are in low conductance states. If a bit "1" is stored in the cell 10, a very small current is conducted through the device 14 while the device 13 couples potential from the digit line D to the gate electrode of the IGFET inverter 12. Similarly if the cell 10 is storing a "0," the device 13 conducts a small current while the device 14 couples potential from the digit line $\overline{D}$ to the gate electrode of the inverter 11. In such standby condition, the devices 13 and 14 act as current limiters so that information is prevented from either being written into or being read out of the cell 10.

For the write function, the potential on the word line W is reduced to a potential near ground so that the IGFET devices 13 and 14 are in high conductance states. In response to signals on the digit lines D and $\overline{D}$ requiring a change of the memory state, enough current can be conducted through the conducting IGFET 12 so that voltage drop across that device exceeds the threshold voltage of the device 11 and makes it commence conduction.

For the read function, the potential on the word line W is intermediate between its levels for standby and write. The current through the conducting device 11 and its load device 13 increases causing a change of current in the digit line D, but the change is insufficient to bias the device 12 into conduction.

In addition, the word line W couples the three voltage levels to all other cells in the same memory word as the cell 10. This intercoupling to other cells of the array is illustrated in the diagram by an orthogonal line having a negative slope which indicates a first direction through the array of cells. All cells of the associated word respond concurrently in their operations in a manner corresponding to whatever one of the three voltage levels is applied at a given time.

The complementary digit lines D and $\overline{D}$ are connected respectively to drain electrodes of the IGFET devices 13 and 14 for coupling the cell 10 to peripheral digit-write and sense, or detection, circuits. The digit lines D and $\overline{D}$ additionally couple one cell of each memory word in the array to the digit-write and sense circuits. This additional coupling is indicated by the orthogonal lines having a positive slope to indicate a second direction through the array of cells.

The IGFET devices have width-to-length ratios which are interrelated. The width $w$ of each channel is the distance across the substrate surface of the semiconductor channel in a direction perpendicular to the direction of current in the channel. The length $l$ of each channel is the distance between the source and drain electrodes in the direction of the current in the channel. Depth of the channel, although not a factor included within the width-to-length ratio, is a distance from the insulator to the bottom of the substrate region in which the majority carriers accumulate and flow. The inverter devices 11 and 12 have essentially equal width-to-length ratios $w/l(I)$. Likewise, the gating devices 13 and 14 have essentially equal width-to-length ratios $w/l(G)$. A relative ratio R relating the width-to-length ratios of the inverter and gate devices is stated:

$$R=\frac{W/l(I)}{W/l(G)}$$

The ratio R typically has a value between four and ten for useful circuits. If in a particular cell the ratio R is too small, stored information can be lost during a read operation because both devices 11 and 12 will be pulled into conduction rather than just one of them. This loss of information occurs because the voltage drop across the inverter amplifier, which is correctly conducting, exceeds the threshold voltage of the opposite inverter amplifier and causes it to also conduct but in error. If the ratio R is too large, digit-writing into the cell 10 is hindered because overly large voltage swings are required on the digit lines D and $\overline{D}$ and on the word line W for changing the state of the cell 10. This difficulty of changing the state of the cell 10 occurs because the large ratio R involves devices which require more current through either inverter amplifier to establish a source-to-drain voltage that exceeds the threshold voltage of the opposite inverter amplifier.

For partial control of the standby, digit-write and digit-read operations, a digit-write circuit including three bipolar NPN transistors 25, 26, and 27 regulates the potential level on the digit lines D and $\overline{D}$. Collector supply potential from a positive-potential source 29 is coupled respectively by way of resistors 31 and 32 to collector electrodes of the transistors 25 and 26. The collector electrode of the transistor 25 is connected to the digit line D, and the collector electrode of the transistor 26 is connected to the digit line $\overline{D}$. Emitter electrodes of the transistors 25 and 26 are connected together at a common junction which is coupled through a resistor 35 to a collector electrode of the transistor 27.

For a circuit having a typical relative ratio R, the potential of the source 29 is an intermediate value between the potential of the source 17 and ground. The potential of the source 29 is low enough so that the digit lines D and $\overline{D}$ are always held more than the threshold voltage of devices 11 and 12 below the potential of source 17. If the potential of the source 29 is too high, neither of the IGFET devices 11 and 12 are held in conduction during the standby condition because source-to-drain voltage of each device is less than the other's threshold voltage. If the potential of the source 29 is too low, both of the IGFET devices 11 and 12 can be unintentionally turned on during the read operation and thereby cause a loss of stored information. The incorrect device is turned on concurrently with the correct device because source-to-drain voltage drop across the correct device exceeds the threshold voltage of the incorrect device. The impedance of the resistors 31 and 32 together with the impedance of all cells connected to each of the digit lines D and $\overline{D}$ and the operating states of the transistors 25 and 26 determine the potential difference between the source 29 and the digit lines D and $\overline{D}$. If the devices 11 and 13 conduct a small standby current, the current through those devices and the digit line D is increased substantially during the read operation. Although this current is increased, it does not necesarily exceed the current carried by the digit line $\overline{D}$ because a differentiating detector, to be described, detects the change of current.

It is noted that a circuit loop is formed by the connection of the resistors 31 and 32 in a first series circuit between the digit lines D and $\overline{D}$ and by the connection of the channels of the devices 13, 11, 12, and 14 in a second series circuit between the digit lines D and $\overline{D}$. Information stored in the cell 10 during standby operation so controls the states of the devices that current is steered either from the source 17 through the channels of the devices 11 and 13 and the resistor 31 to the source 29 or from the source 17 through the channels of the devices 12 and 14 and the resistor 32 to the source 29.

In the memory system, a central control unit 38 synchronizes standby, read, and write operations of the cell 10 with other circuits in the system. Timing signals from the central control unit 38 are coupled to a write timing source 40, a data source 50, a read timing source 65, and a detector 70 to synchronize their operations in the following manner.

In response to signals from the control unit 38 during standby, read, and write operations, the write timing source 40 generates one or the other of bilevel signals which are coupled through a resistor 41 to a base electrode of transistor 27 for controlling that transistor. The transistor 27 therefore operates alternatively in two modes including cutoff and heavy condction wherein it supplies emitter current required by the transistors 25 and 26. For the standby and read operations of the cell 10, the source 40 applies a signal level of near ground potential. The transistor 27 is cut off so that emitter current for the transistors 25 and 26 is also cut off. While the transistors 25 and 26 are both cut off, they are open circuits with respect to the digit lines D and $\overline{D}$; and the potential on the digit lines D and $\overline{D}$ is determined in accordance with the state of the cell 10 and the signal level on the word line W as described hereinafter. During the write operation, the source 40 applies a substantial positive potential and causes the transistor 27 to conduct in saturation as an emitter current source for the transistors 25 and 26. Further description of the standby, read, and write operations follows hereinafter.

While the transistor 27 is conducting, the transistors 25 and 26 of the digit-write circuit conduct alternatively and thereby contribute toward determining the potential on the digit lines D and $\overline{D}$. A positive-potential source 43 is coupled through a voltage divider comprising a resistor 45 and a series of diodes 47 to ground for establishing a reference potential on a base electrode of the transistor 26. The data source 50 is coupled through a resistor 51 to a base electrode of the transistor 25 so that data signals having one of two alternative potential levels are applied to the base electrode of the transistor 25.

To write in a bit "0," a first potential level less than the reference potential established on the base electrode of transistor 26 is applied to the base electrode of transistor 25 when the write potential, previously mentioned, is applied to the word line W. In these bias conditions, the transistor 25 is cut off and the transistor 26 conducts in saturation. Because the transistor 25 is cut off, the potential on the digit line D is held at a potential determined by the source 29, the resistor 31, and the current drawn by cells connected to the digit line D. The potential on the digit line D is coupled through the device 13 and the lead 19 to the gate electrode of the device 12 so that the source-to-gate voltage of the device 12 continues to exceed its threshold voltage. Since the transistors 26 and 27 are conducting in saturation, the resistors 32 and 35 form, between the source 29 and ground at the emitter electrode of the transistor 27, a voltage divider which reduces the potential on the digit line $\overline{D}$ to a low positive level. In the worst case, all cells initially are in their "1" state, and the cell 10 is signalled to change to its "0" state. The resistors 32 and 35 must be small enough so that current drawn by other cells has little effect on the potential of the digit line $\overline{D}$. The potential on the digit line $\overline{D}$ is low enough to draw the device 12 into a higher conduction state in which current through the device 12 is limited at a high value by conductance of the device 14 so that the source-to-drain voltage drop across the device 12 exceeds the threshold voltage of the device 11. Thus the device 11 conducts lightly thereby reducing its source-to-drain voltage below the threshold voltage of the device 12. Therefore the device 12 is cut off, and the devices 11 and 13 thereafter continue to conduct indicating that the cell 10 is storing a bit "0."

To write in a bit "1," a second potential level greater than the reference potential level established on the base electrode of transistor 26 is applied to the base of transistor 25 so that the transistor 25 conducts in saturation and the transistor 26 is cut off. Thus, the potential on the digit line $\overline{D}$ is held at an intermediate positive potential determined by the source 29, the resistor 32, and the current drawn by the cells connected to the digit line $\overline{D}$. The potential on the digit line $\overline{D}$ is coupled through the device 14 and the lead 18 to the gate electrode of the device 11 so that the source-to-gate voltage of the device 11 continues to exceed its threshold voltage. The potential on the digit line D is reduced to a low positive level by the resistors 31 and 35 forming a voltage divider between the source 29 and ground. In the worst case, all cells initially are in their "0" state and one is signalled to change to its "1" state. The resistors 31 and 35 must be small enough so that current drawn by other cells has little effect on the potential of the digit line D. The potential on the digit line D is low enough to draw device 11 into a higher conduction state in which current through the device 11 is limited at a high value by conductance of the device 13 so that the source-to-drain voltage drop across the device 11 exceeds the threshold voltage of the device 12. Thus the device 12 conducts lightly thereby reducing its source-to-drain voltage below the threshold voltage of the device 11. Therefore, the device 11 is cut off, and the devices 12 and 14 thereafter continue to conduct indicating the cell 10 is storing a bit "1."

Three voltage levels are applied to the word line W by the operation of two additional bipolar NPN transistors 55 and 56 which are arranged as grounded-emitter circuits. A positive-potential source 58 is coupled through a resistor 59 to a collector electrode 60 of the transistor 55. The collector electrode 60 is connected to the word line W and is coupled by way of a resistor 61 to a collector electrode of the transistor 56.

The transistors 55 and 56 are arranged to fix three states of memory cell operation. The three states of operation include two states in which one or the other of the transistors 55 and 56 conducts alone and a third state in which both transistors 55 and 56 are cut off simultaneously. For standby operation both transistors 55 and 56 are cut off, and the potential on the word line W rises to a value near the potential of the source 58. For the digit-write operation, the transistor 56 remains cut off while a positive potential from the source 40 is coupled to the base electrode of the transistor 55 to bias it to conduct in saturation and thereby couple ground potential to the word line W. For the digit read operation, the transistor 55 remains cut off while a read timing source 65, in response to control signals from the unit 38, applies a positive potential signal to the base electrode of the transistor 56. The transistor 56 then conducts in saturation and couples ground potential to the lower end of the resistor 61. The resistors 59 and 61 form a voltage divider between the source 58 and ground so that they produce at their intermediate junction the intermediate positive potential that is applied to the word line W for controlling the read operation of cell 10.

In operation the cell 10 is held in its standby state when the high positive potential with respect to ground is applied over the word line W. During such standby operation, the word line potential is below the potential of the source 17 by a magnitude slightly exceeding the sum of the threshold voltage of the device 13 or 14 plus the source-to-drain voltage of the conducting one of the devices 11 and 12. This is sufficient to hold either the device 11 or the device 12 in conduction. The write timing source 40 and the read timing source 65 each apply near-ground potentials. The transistors 25, 26, and 27 are cut off so that the digit lines D and $\overline{D}$ are held at an intermediate potential previously described in regard to standby operation. The potential on the word line W must be high enough so that the devices 13 and 14 are each biased in a low current limiting state. If in this standby condition the cell stores a "1," the device 14 is biased to conduct a small current for holding the state of the cell 10; and the device 13 only couples potential to the gate of the device 12. The device 12 is thereby biased to conduct, and the small current is conducted through the devices 12 and 14 and the resistor 32 to the source 29. The device 11 is cut off so that current is absent from the path through the devices 11 and 13. The devices 11 and 12 are effectively isolated by the current limiting characteristic of the devices 13 and 14 from potential fluctuations which occur on the digit lines D and $\overline{D}$ when other cells are being written into, and which might tend to change conduction from the device 12 to the device 11.

Writing into the cell 10 is accomplished by changing the word line potential to its level near ground potential. The write timing source 40, in response to a control signal from the unit 38, supplies a positive potential signal so that the transistors 27 and 55 conduct. Also in response to the unit 38, the read timing source 65 applies a near ground potential to keep the transistor 56 cut off so that ground potential is coupled through the transistor 55 to the word line W. The word line potential is then low enough so that the devices 13 and 14 are held in a state of high conductance. A new data bit to be written into the cell 10 may be the same as the bit presently stored, or the new bit may be different. When the new bit is different, the cell 10 must change state in a manner explained by the following examples.

For a first example, consider that the cell 10 is initially storing a bit "0," that the devices 11 and 13 are conducting in their standby condition, and that the data source 50 applies a high potential to change the state of cell 10 to indicate a bit "1." The transistor 25 will conduct. A digit-write signal including a temporary near ground potential occurs on the digit line D and an intermediate positive potential occurs on the digit line $\overline{D}$ to indicate that a bit "1" should be written. The voltage drop from the source 17 to the digit line D is increased enough so that the source-to-drain voltage across the device 11 exceeds the threshold voltage of the device 12 which is pulled into conduction. The device 12 turns on and conducts a current from the source 17 through the devices 12 and 14 and the resistor 32 to the source 29. The source-to-drain voltage drop across the device 12 then is reduced below the threshold voltage of the device 11 which is thereby cut off. Since the device 11 is cut off, current ceases in the path from the source 17 through the device 11. The cell 10 indicates storage of the bit "1" because the devices 12 and 14 continue to conduct a small current after the potential on the word line W is returned to its standby potential.

Conversely for a second example, consider that the cell 10 is initially storing a bit "1," that the devices 12 and 14 are conducting in their standby condition, and that the data source 50 applies a low potential to change the state of cell 10 to indicate a bit "0." The digit line $\overline{D}$ is temporarily low, the digit line D maintains its intermediate positive potential, and the word line potential is changed to near ground. The voltage drop from the source 17 to the digit line $\overline{D}$ is increased enough so that the source-to-drain voltage across device 12 exceeds the threshold voltage of the device 11. The device 11 turns on and conducts a current from the source 17 through the devices 11 and 13 and the resistor 31 to the source 29. The source-to-drain voltage drop across the device 11 is reduced enough to cut off the device 12. The devices 11 and 13 thereafter indicate storage of the bit "0" by continuing to conduct a small current after the potential on the word line W is returned to standby.

Reading from the cell 10 is accomplished by applying the intermediate positive potential to the word line W, as previously described, while the digit lines D and $\overline{D}$ are also held at intermediate positive potentials. The write timing source 40 applies a near ground potential to keep the transistor 27 cut off. As previously described, the intermediate positive potential on the word line W must be lower than the standby potential on the word line W but must be higher than the write potential of the word line W. The read potential on the word line W is sufficiently low to produce across the devices 13 and 14 a source-to-gate voltage exceeding the threshold voltage of those devices for holding them in a state of intermediate conductance. If for example the device 12 were biased to conduct as a result of a previous write bit "1" operation and the read potential is applied to the word line W, the device 12 and the device 14 conduct more than standby current and provide a low impedance path from the source 17 to the digit line $\overline{D}$. Thus a substantial change of current occurs in the path from the source 17 through those devices and the digit line $\overline{D}$ to a detector 70 indicating a bit "1." A similar change of current does not occur in the path through the devices 11 and 13 and the digit line D because the device 11 is cut off.

If the cell 10 were storing a bit "0" as a result of a previous write operation and the read potential is applied to the word line W, a substantial change of current would occur in the path from the source 17 through the devices 11 and 13 and the digit line D to the detector 70 indicating a bit "0." At such a time, the device 12 is cut off so that a large change of current does not occur in the path including the digit line $\overline{D}$.

The detector 70 has two input terminals connected respectively to the digit lines D and $\overline{D}$ for detecting a change of current in the digit line which is associated with the devices that are conducting when the read operation is undertaken. This read operation is undertaken in response to a signal from the unit 38. During write and standby operations the detector 70 is held in its off state by the unit 38. The detector 70 is a grounded circuit arranged to provide an indication of whether a bit "1" or a bit "0" is read. Such a detector has been described in a copending patent application of J. E. Iwersen et al., filed Feb. 7, 1967, and assigned Ser. No. 614,489, and also described in the "1967 International Solid-State Circuits Conference Digest of Technical Papers," pages 74 and 75, Fig. 5(*b*). The detector there described can be used as a detector for signals from the herein disclosed invention when suitable well-known adjustments are made to coordinate impedances, signal levels and polarities.

The above detailed description is illustrative of one embodiment of the invention, and it is to be understood that additional embodiments thereof will be obvious to those skilled in the art. The embodiment described herein together with those additional embodiments are considered to be within the scope of the invention.

What is claimed is:

1. A memory cell comprising:
- first and second unipolar conducting devices each having a gate electrode and first and second controlled electrodes,
- a source of reference potential,
- means applying the reference potential to the first controlled electrode of the first device and to the first controlled electrode of the second device,
- means coupling the gate electrode of the first device to the second controlled electrode of the second device,
- means coupling the gate electrode of the second device to the second controlled electrode of the first device,
- third and fourth unipolar conducting devices each having a gate electrode, a controlled electrode, and a threshold voltage,
- means coupling the controlled electrode of the third device to the second controlled electrode of the first device,
- means coupling the controlled electrode of the fourth device to the second controlled electrode of the second device,
- a source producing three different potential level signals, all of said level signals having a potential different from the reference potential by a magnitude exceeding the threshold voltage of the third and fourth devices, and
- means coupling the three level source to the gate electrodes of the third and fourth devices,

2. A memory cell in accordance with claim 1 further comprising:
- a source of reference potential coupled to the first controlled electrodes of the first and second devices,
- a digit-write circuit,
- means coupling the digit-write circuit to a second controlled electrode of each of the third and fourth devices, and
- a detector coupled to the second controlled electrode of each of the third and fourth devices.

3. A memory cell in accordance with claim 2 in which:
- the first, second, third, and fourth unipolar conducting devices are enhancement-mode insulated-gate field-effect transistors.

4. A memory circuit comprising:
- first, second, third, and fourth insulated-gate field-effect transistors,
- means cross-coupling the first and second transistors,
- impedance devices, and
- means connecting in a circuit loop the impedance devices, a conducting channel of the third transistor, a conducting channel of the first transistor, a conducting channel of the second transistor, and a conducting channel of the fourth transistor.

5. A memory system comprising:
- a source of reference potential,
- first and second semiconductor devices cross-coupled for bistable operation and connected to the source of reference potential,
- additional circuit means for conducting current,
- third and fourth semiconductor devices connected in series between the first and second devices, respectively, and the additional circuit means, said third and fourth devices each having a threshold voltage, and
- means applying three selectable level signals to control conductivity of the third and fourth devices, all of said three selectable signal levels being different from the reference potential by a voltage exceeding the threshold voltage, whereby coupling is controlled between the first and second devices and the additional circuit means.

6. A memory system in accordance with claim 5 in which:

the third and fourth devices hold a first of bistable operating states of the first and second devices in response to a first level signal, the third and fourth devices enable change of the operating states of the first and second devices in response to a second level signal, and the third and fourth devices enable detection of the operating state of the first and second devices in response to a third level signal.

References Cited

UNITED STATES PATENTS

| | | | |
|---|---|---|---|
| 3,390,382 | 6/1968 | Igarashi | 340—173 |
| 3,447,137 | 5/1969 | Fever | 340—173 |

BERNARD KONICK, Primary Examiner

J. F. BREIMAYER, Assistant Examiner

U.S. Cl. X.R.

307—238, 291